United States Patent [19]

Wu et al.

[11] Patent Number: 5,781,927
[45] Date of Patent: Jul. 14, 1998

[54] MAIN MEMORY ARBITRATION WITH PRIORITY SCHEDULING CAPABILITY INCLUDING MULTIPLE PRIORTY SIGNAL CONNECTIONS

[75] Inventors: Wen-Yi Wu, Hsinchu Hsien; Gene Yang, Tao Yuan Hsien, both of Taiwan

[73] Assignee: United Microelectronics Corporation, Hsinchu, Taiwan

[21] Appl. No.: 593,804

[22] Filed: Jan. 30, 1996

[51] Int. Cl.[6] .................... G06F 13/00; G06F 13/366
[52] U.S. Cl. .................. 711/151; 711/158; 395/728; 395/727; 395/860; 395/864; 395/732
[58] Field of Search ...................... 395/200.08, 860, 395/864, 478, 727, 728, 732; 711/151, 158

[56] References Cited

U.S. PATENT DOCUMENTS

| | | | |
|---|---|---|---|
| 4,028,663 | 6/1977 | Royer et al. ................. | 711/151 |
| 4,788,640 | 11/1988 | Hansen ........................ | 711/151 |
| 4,821,177 | 4/1989 | Koegel et al. ................ | 711/149 |
| 5,016,165 | 5/1991 | Tanikawa et al. ............. | 395/842 |
| 5,072,420 | 12/1991 | Conley et al. ................ | 395/877 |

*Primary Examiner*—Eddie P. Chan
*Assistant Examiner*—Hong C. Kim
*Attorney, Agent, or Firm*—Cushman Darby & Cushman IP Group of Pillsbury Madison & Sutro LLP

[57] ABSTRACT

A main memory arbitration arrangement for a computer system. It features the ability to set priorities between a main system and peripheral system to optimize system efficiency. The arbitration arrangement comprises a main memory controller and a peripheral system. The main memory controller has ports for issuing memory request signals of various priority levels determined based on urgency of the need for the main memory. The main memory controller will determine whether to yield the control of the main memory to the peripheral system based on the priority level of the memory request signal received and the urgency of the current operating condition of the main system. The result is the enhancing of the overall efficiency of the computer system.

8 Claims, 3 Drawing Sheets

MAIN MEMORY ARBITRATION WITH PRIORITY SCHEDULING CAPABILITY INCLUDING MULTIPLE PRIORTY SIGNAL CONNECTIONS

BACKGROUND OF THE INVENTION

1. Field of the Invention

The present invention relates in general to arbitration of requests to utilize main memory of a computer system. More particularly, the invention is directed to an arrangement for arbitrating control of a computer system main memory between demands made by the computer's "main system" and its "peripheral system" based on predetermined time-sharing priority levels.

2. Description of Prior Art

In computer systems having conventional main memory sharing architectures, the computer system "peripheral system" and its "main system" share a common main memory resource. When the peripheral system needs to use main memory, it issues a memory request signal to request the main system to yield control of the main memory. It is a drawback to this architecture that, since there are no priority provisions to the memory request signal, the main system must yield control of the main memory immediately to the peripheral system no matter how urgent a task the main system is currently carrying out using the main memory. The lack of main memory arbitration provisions causes the main system to operate at less than its optimum operating efficiency.

A practical example will be explained with reference to FIG. 1 (Prior Art), which shows a conventional memory sharing architecture that allows a video peripheral (Video Graphic Accelerator) to share the main memory with the computer main system. CPU 110 is the heart of the computer system, whose processing efficiency represents that of the overall computer system. The CPU 110 gains access to the DRAM 140 (the main memory) via the main memory controller 120 and a data buffer controller 130. In order to enhance system efficiency, the main memory controller 120, under normal operating conditions, has control of the DRAM 140. To gain access to the DRAM 140, the CPU 110 issues the address signal via the address bus 115 to the main memory controller 120. The main memory controller 120 decodes the address signal. The decoded address is sent via an access control bus 125 to the DRAM 140. Concurrently, the main memory controller 120 issues control signal to the data buffer controller 130. If the CPU 110 wants to read data out of the DRAM 140, the DRAM 140 will put the required data on the memory data bus 145. Then the data buffer controller 130 will transfer the data on the memory data bus 145 to the data bus 113 for the main system to fetch the data. On the other hand, if the CPU 110 wants to write data into the DRAM 140, it will put the data on the data bus 113, allowing the data buffer controller 130 to fetch the data thereon and then transfer the data to the memory data bus 145 connected to the DRAM 140. Reference numeral 170 represents a local bus.

Using this type of memory sharing architecture, the video peripheral system stores its data in the DRAM 140. If the video graphic accelerator 150 wants to gain access to the DRAM 140, it first issues memory request signal MREG# via the signal line 155 to the main memory controller 120, and then waits until the CPU 110 completes its current read/write operation. The main memory controller 120 then returns the memory grant signal MGNT# via the signal line 165 to the video graphic accelerator 150. Concurrently, the main memory controller 120 puts its I/O ports that are connected to the access control bus 125 at high impedance so as to yield the control thereof. The video graphic accelerator 150 then issues a succession of access control bus signal via the access control bus 125 to the DRAM 140 so as to gain access to the DRAM 140. After the read/write operation is completed, the video graphic accelerator 150 will put its I/O ports that are connected to the access control bus 125 at high impedance so as to yield the control of the access control bus 125, and also clear the memory request signal MREG# on the signal line 155. This causes the main memory controller 120 to gain control of the main memory and return to normal operating conditions.

When the video peripheral system wants to perform a read/write operation, the foregoing procedure is carried out. Since there is only one memory request signal, the main system must yield control of the data bus at a specific time. Otherwise, the video peripheral system would suffer from lack of adequate data for display on the monitor screen. However, if at the same time the main system has an urgent need for main memory, the main system nevertheless must yield control of the main memory to the video peripheral system upon receiving the memory request signal, and has to wait until the video peripheral system completes its task to regain control of the main memory. This could, therefore, affect the efficiency of the main system. If the video peripheral system is overloaded with the read/write operation on the main memory, the efficiency of the main system could be affected to an unacceptable level. With the capacity of a single memory chip getting higher and higher, it makes sense for various systems of a computer to share main memory. However, this must be done in an efficient manner. Thus, there is a need for a main memory sharing architecture which permits the saving of cost and circuit space without sacrificing operational efficiency.

SUMMARY OF THE INVENTION

It is therefore a primary objective of the present invention to provide a main memory arbitration arrangement which controls the use of main memory based on memory request signals of various predetermined priority levels, allowing the main system to have the ability to arbitrate among various memory demands in a manner that enhances system throughput.

In accordance with the foregoing and other objectives, the present invention provides a novel main memory arrangement having priority scheduling capability. The arbitration arrangement is for use on a computer system having at least a CPU, and a main memory unit, and comprises (a) a main memory controller coupled respectively to the CPU, and the main memory unit, for controlling access to the main memory and precedence to use the main memory; and (b) a peripheral system coupled to the main memory and the main memory controller. The peripheral system is capable of issuing memory request signals of highest priority level and second highest priority level to the main memory controller based on urgency of the peripheral system to use the main memory unit. The main memory controller yields control of the main memory unit to the peripheral system upon receiving the highest priority level memory request signal. However, upon receiving the second highest level memory request signal, the main memory controller determines whether to yield control of the main memory unit to the peripheral system based on urgency of current operating condition of the CPU.

BRIEF DESCRIPTION OF DRAWINGS

The present invention can be more fully understood by reading the subsequent detailed description of the preferred embodiments thereof with references made to the accompanying drawings, wherein.

DETAILED DESCRIPTION OF THE INVENTION

Figure 1:
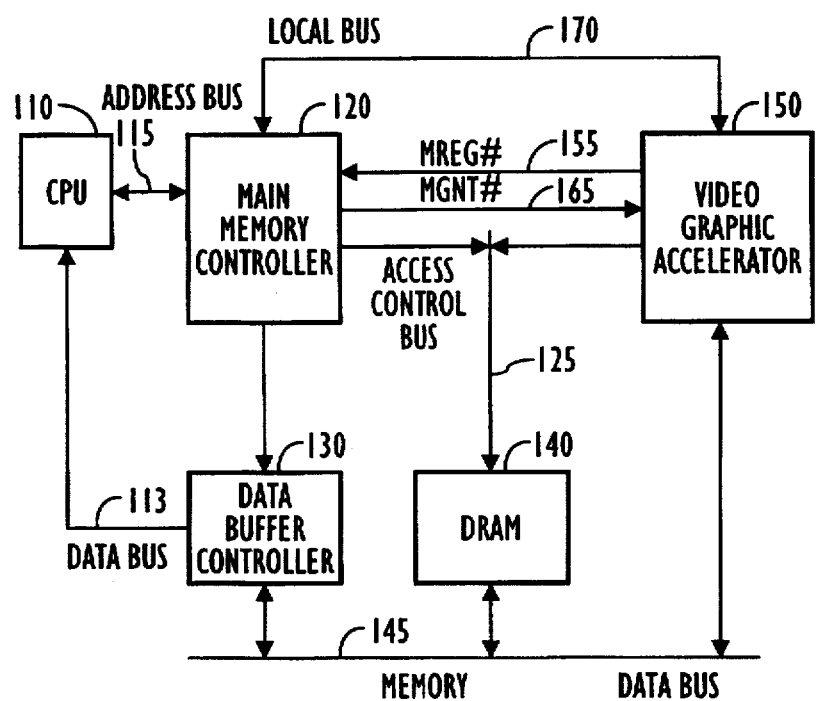
FIG. 1 (Prior Art) is a block diagram showing a conventional arbitration configuration for a video graphic accelerator and the main system to share the main memory.
Figure 2:
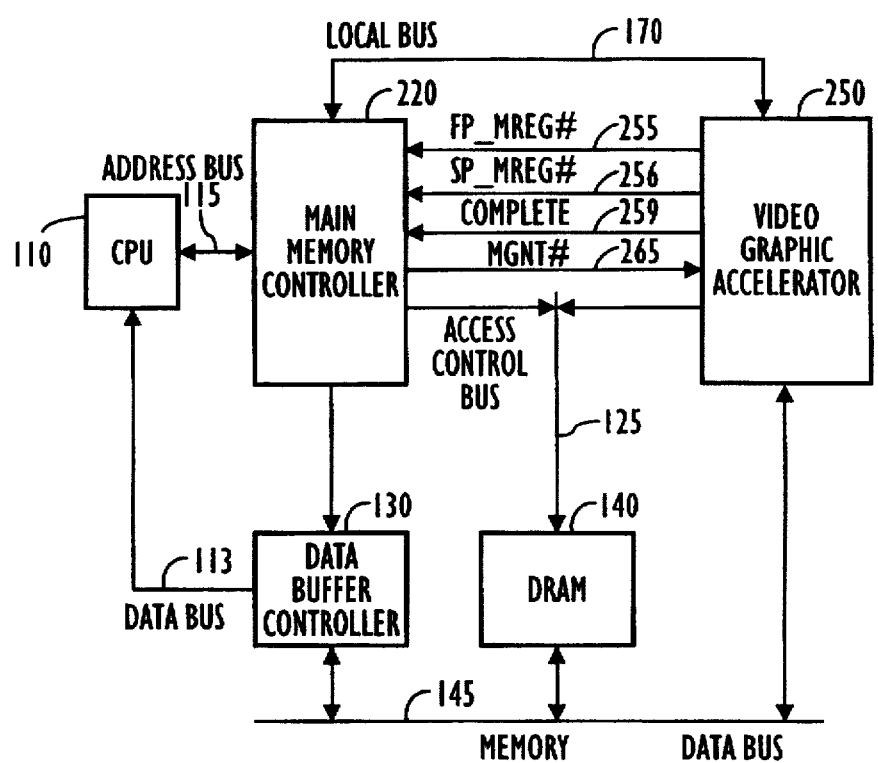
FIG. 2 is a block diagram, showing an arbitration configuration in accordance with the present invention for a video graphic accelerator and the main system to share the main memory.

FIG. 2 is a block diagram, showing an arbitration configuration in accordance with the present invention for a video graphic accelerator and the main system to share the main memory. The main components of the arrangement are incorporated into a main memory controller 220 and a peripheral system, represented in this embodiment by a video graphic accelerator 250. Of course, the invention is not limited to the use of a video graphic accelerator. It is merely a convenient example of a peripheral system for which the present invention is useful. Main memory controller 220 has ports for receiving memory request signals of two different priority levels, and video graphic accelerator 250 includes means for issuing memory request signals of two different priority levels based on the urgency of various operating conditions for the need of the main memory. Reference numeral 170 represents a local bus and is not particularly relevant to the present invention. The present invention can be used in a variety of hardware/bus arrangements.

In the event of any abnormal circumstances that would result in serious consequences such as a system crash or disturbance, the peripheral system will issue the highest-priority memory request signal to immediately gain access to the main memory so as to execute necessary routines to cope with the trouble. In contrast, when the peripheral system needs the main memory but it has available buffer that can be momentarily used, the next lower-priority memory request signal will be issued. In this case, the main system will determine whether the main memory is to be given to the peripheral system based on the priority of the current job being carried out by the main system. If the current job being carried out by the computer main system has a higher priority than that of the memory request signal from the peripheral system, the main system will continue to control the main memory and, at a later time, give control of main memory to the peripheral system. If the peripheral system cannot wait too long until the main system completes its current job, the peripheral system can issue its highest-priority memory request signal in order to attempt to take control of main memory.

Under normal operating conditions the main memory controller 220 has the control of the DRAM (dynamic random access memory) 140. When the CPU 110 needs to use the DRAM 140, it issues an address signal via the address bus 115 to the main memory controller 220, which then decodes the address signal to obtain memory read/write control signals sent via the bus 125 to the DRAM 140 for read/write operations on the DRAM 140. Concurrently, the main memory controller 220 issues control signal to the data buffer controller 130. If at this time the CPU 110 wants to read data, the DRAM 140 will put the data on the memory data bus 145 and then the data buffer controller 130 will fetch the data thereon and send it via the data bus 113 to the CPU 110. If the CPU 110 wants to write data into the DRAM 140, it will put the data on the data bus 113 and then the data buffer controller 130 will fetch the data thereon and send it via the memory data bus 145 to the DRAM 140.

In the video graphic accelerator 250, there is provided a FIFO (first-in first-out) write buffer serving as a temporary storage area for write operations of the video graphic accelerator 250 to a dedicated video data segment in the DRAM 140. A FIFO read buffer serves as a temporary storage area for read operations from the dedicated video data segment in the DRAM 140 to the video graphic accelerator 250.

Figure 3:
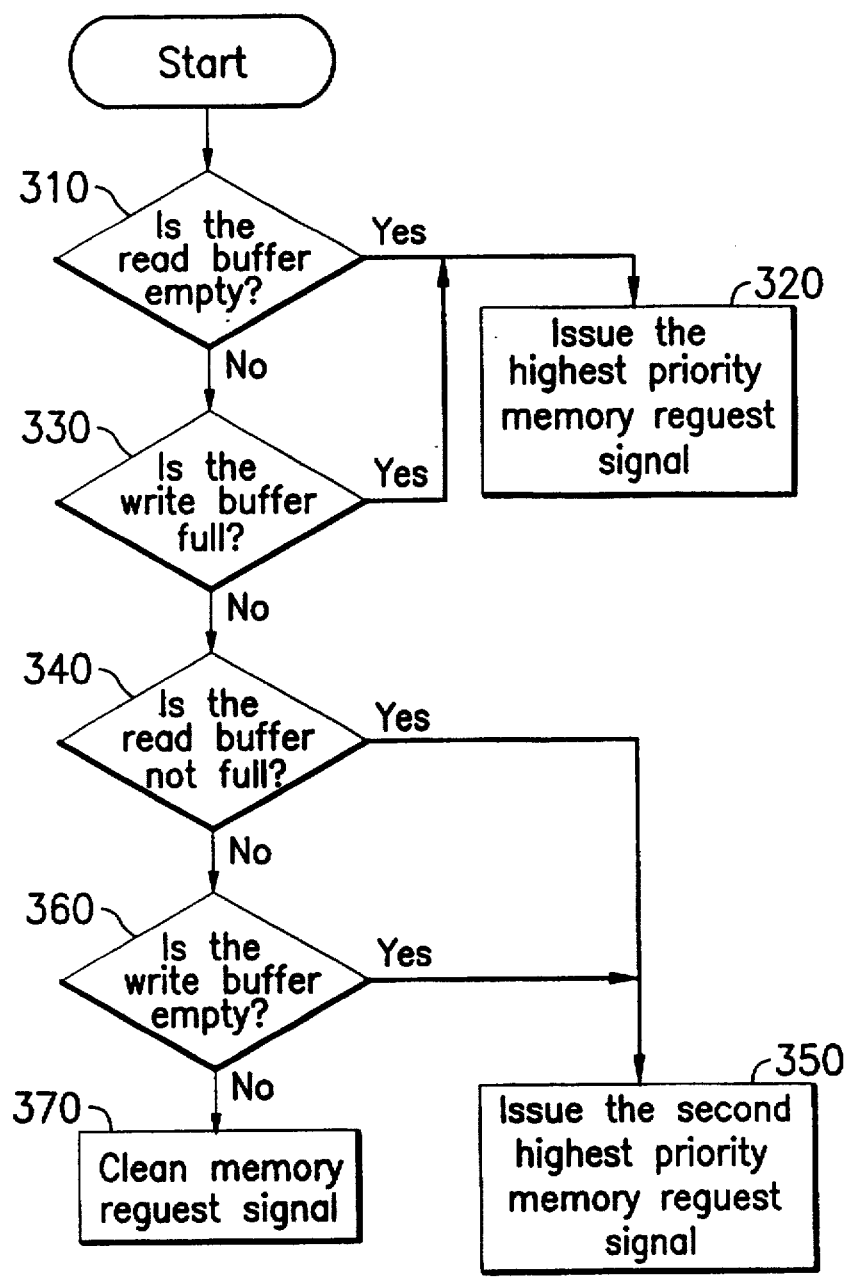
FIG. 3 a flow diagram, showing the procedural steps taken by the video graphic accelerator to determine the issuing of memory request signals of various priority levels.

FIG. 3 is a flow diagram showing the procedural steps by which the video graphic accelerator 250 determines whether to issue memory request signal and what priority level is to be given to the memory request signal. In the initial step 310, the read buffer is checked to determine whether it is empty. If YES (read buffer empty), control passes to step 320 in which the highest-priority memory request signal is issued so as to prevent the monitor screen from disordered display. If, however, the answer at step 310 is NO (read buffer not empty), control passes to step 330. At step 330 the write buffer is checked to determine whether it is full. If YES (write buffer full), control passes to step 320 and the highest-priority memory request signal is issued so as to prevent data loss by stopping the CPU 110 from writing data via the video graphic accelerator 250 into the DRAM 140. However, if the answer at step 330 is NO, control passes to step 340, in which the read buffer is checked to determine if it is not full. If YES (read buffer not full), control passes to step 350, in which the second highest-priority memory request signal is issued so as to inform the main memory controller 220 to yield the control of the memory bus to the video graphic accelerator 250 provided that the CPU 110 is not in urgent need for the DRAM 140, allowing the video graphic accelerator 250 to read data out of the dedicated video data segment in the DRAM 140 to fill up the read buffer. If however, the answer at step 340 is NO (read buffer full), control passes to step 360, in which the write buffer is checked to determine if it is not empty. If YES (not empty), control passes to step 350, in which the second-highest priority memory request signal is issued so as to inform the main memory controller 220 to yield the control of the memory bus to the video graphic accelerator 250 provided that the CPU 110 is not in urgent need for the DRAM 140, allowing the video graphic accelerator 250 to write data into the dedicated video data segment in the DRAM 140 to clear up the write buffer. If, however, the answer at step 360 is NO, control passes to the final step 370, in which no memory request signal is to be issued. For simplicity, this example is based on a video graphic accelerator. Other types of peripheral devices would decide what level of priority request to make based on other conditions and circumstances.

The video graphic accelerator 250, in accordance with the flow diagram of FIG. 3, determines whether to issue the highest-priority memory request signal FP_MREG#. Referring back to FIG. 2, if the video graphic accelerator 250 issues the highest-priority memory request signal FP_MREG# via the signal line 255 to the main memory controller 220, the main memory controller 220 should return in a short preset time a memory grant signal MGNT# via the signal line 265 to the video graphic accelerator 250. Meanwhile, the main memory controller 220 puts its I/O ports that are connected to the access control bus 125 at high impedance so as to yield the control thereof Then the video graphic accelerator 250 issues a sequence of access control signals via the access control bus 125 so as to gain access to the DRAM 140. After data read/write operation is completed, the video graphic accelerator 250 will put its I/O ports that are connected to the access control bus 125 at high impedance so as to yield the control thereof, and concurrently issue an access complete signal Complete via the signal line 259 to the main memory controller 220 and also clear the highest-priority memory request signal FP_MREG# on the signal line 255. This action informs the main memory controller 220 that the video graphic accelerator 250 yields the control of the DRAM 140 back to the main memory controller 220. In case the CPU 110 is in urgent need for the DRAM 140 during the time the video graphic accelerator 250 has control of the DRAM 140, the main memory controller 220 will clear the memory grant signal MGNT# at an earlier time so as to inform the video graphic accelerator 250 to yield the control of the DRAM 140 as soon as possible.

If the video graphic accelerator 250 issues the second-highest priority memory request signal SP_MREG# via the signal line 256 to the main memory controller 220, the main memory controller 220 will determine whether to immediately yield the control of access control bus 125 or at a later time according to the current operating condition of the CPU 110. If the CPU 110 is in urgent need for the DRAM 140, the main memory controller 220 will continue the current read/write operation by the CPU 110 to the DRAM 140 until the CPU 110 completes the task or until the video graphic accelerator 250 issues the highest priority memory request signal. When the CPU 110 yields its control of the DRAM 140, the main memory controller 220 returns the memory grant signal MGNT# via the signal line 265 to the video graphic accelerator 250 and concurrently puts its I/O ports that are connected to the access control bus 125 at high impedance so as to yield the control thereof. Subsequently, the video graphic accelerator 250 issues a succession of access control bus signals to gain access to the DRAM 140. When the read/write operation is completed, the video graphic accelerator 250 will put its I/O ports that are connected to the access control bus 125 at high impedance so as to yield the control thereof, and then issue the access complete signal Complete via the signal line 259 so as to clear the second-highest priority memory request signal SP_MREG#. If at this time the highest priority memory request signal FP_MPRG# has been issued, it is also to be cleared so as to yield the control of the DRAM 140. With the memory request signals provided with various priority levels, the main system is allowed to have sufficient capacity for efficient arbitration of the main memory to enhance system throughputs.

In various embodiments, the video graphic accelerator 250 and the main memory controller 220, or the CPU 110 and the data buffer controller 130, can be combined into a single integrated circuit, i.e., the main system and the peripheral system can be combined into a single IC chip and such combination is still within the spirit and scope of the present invention.

The present invention has been described with exemplary preferred embodiments. However, it is to be understood that the scope of the present invention need not be limited to the disclosed preferred embodiments. For example, the invention was described in terms of two distinct priorities. Any number of priorities could be used without departing from the spirit of the invention. The scope of the claims should be accorded the broadest interpretation so as to encompass all such modifications and similar arrangements.

What is claimed is:

1. A main memory arbitration arrangement having priority scheduling capability for a computer system having a CPU, a main memory, and a peripheral system, the arbitration arrangement comprising:

a main memory controller, coupled to both the CPU and the main memory, for controlling access to the main memory;

a first connection and a second connection, connecting the peripheral system and the main memory controller and for transmitting signals from the peripheral system to the main memory;

means, within the peripheral system which is coupled to the main memory for issuing a first memory request signal priority level request for main memory usage to the main memory controller via the first connection and a second memory request signal indicative of a second highest priority level request for main memory usage to the main memory controller via the second connection, the first and second memory request signals being issued based on the urgency of the need of the peripheral system to use the main memory;

means, within the main memory controller, for yielding control of the main memory unit to the peripheral system upon receiving the first memory request signal, and means, within the main memory controller, for determining whether to yield control of the main memory unit to the peripheral system based on urgency of a current operating condition of the CPU upon receiving the second memory request signal.

2. A main memory arbitration arrangement as claimed in claim 1, wherein the main memory controller and the peripheral system are integrated into a single integrated circuit.

3. A main memory arbitration arrangement as claimed in claim 1, wherein the peripheral system comprises a video graphic accelerator.

4. A main memory arbitration arrangement as claimed in claim 1, wherein the main memory comprises DRAM.

5. A main memory arbitration arrangement having priority scheduling capability for a computer system having a CPU, a main memory , and a peripheral system, the arbitration arrangement comprising:

a main memory controller, coupled to both the CPU and the main memory, for controlling access to the main memory;

at least two connections, connecting the peripheral system and the main memory controller and for sending signals from the peripheral system to the main memory;

means, within the peripheral system which is coupled to the main memory .for issuing a first memory request signal priority level request for main memory usage to the main memory controller via one of the connections and a plurality of memory request signals indicative of second highest and lower priority levels request for main memory usage to the main memory controller via connections different from the connection selected for issuing the first memory signal, the various memory request signals being issued based on the urgency of the need of the peripheral system to use the main memory;

means, within the main memory controller, for yielding control of the main memory unit to the peripheral system upon receiving the first memory request signal, and means, within the main memory controller, for determining whether to yield control of the main memory unit to the peripheral system based on urgency of a current operating condition of the CPU upon receiving any memory request signals other than the first memory request signal.

6. A main memory arbitration arrangement as claimed in claim 5, wherein the main memory controller and the peripheral system are integrated into a single integrated circuit.

7. A main memory arbitration arrangement as claimed in claim 5, wherein the peripheral system comprises a video graphic accelerator.

8. A main memory arbitration arrangement as claimed in claim 5, wherein the main memory comprises DRAM.

* * * * *